United States Patent

Kuroiwa et al.

[11] Patent Number: 5,446,556
[45] Date of Patent: Aug. 29, 1995

[54] VIDEO CLOCK SIGNAL GENERATOR IN AN OPTICAL SCANNER IN WHICH A MASK INCLUDING A LINEAR SCALE PROVIDES TIMING FOR CONTROLLING THE AMPLITUDE OF A VIBRATING MIRROR

[75] Inventors: Yoshinori Kuroiwa, Chigasaki; Hiroshi Nishida, Tokyo; Hisashi Okugawa; Yutaka Ichihara, both of Yokohama; Satoru Kumagai, Chigasaki, all of Japan

[73] Assignee: Nikon Corporation, Tokyo, Japan

[21] Appl. No.: 234,624

[22] Filed: Apr. 28, 1994

Related U.S. Application Data

[63] Continuation-in-part of Ser. No. 970,868, Nov. 3, 1992, abandoned.

[30] Foreign Application Priority Data

| Nov. 7, 1991 | [JP] | Japan | 3-291723 |
| Nov. 7, 1991 | [JP] | Japan | 3-291724 |
| Nov. 12, 1991 | [JP] | Japan | 3-295944 |
| Jun. 25, 1993 | [JP] | Japan | 5-177598 |

[51] Int. Cl.$^6$ .................. H04N 1/047; H04N 1/113
[52] U.S. Cl. .................. 358/406; 358/474; 358/480; 358/494; 250/236; 250/237 R
[58] Field of Search ............... 358/406, 474, 480, 481, 358/494; 250/234, 235, 236, 237 R; 359/236, 566

[56] References Cited

U.S. PATENT DOCUMENTS

| 4,044,248 | 8/1977 | Glassman . | |
| 4,204,233 | 5/1980 | Swager | 358/481 |
| 4,212,018 | 7/1980 | Ohnishi et al. . | |
| 4,584,612 | 4/1986 | Ono . | |
| 4,600,951 | 7/1986 | Blitchington | 358/481 |
| 4,638,156 | 1/1987 | Horikawa et al. | 250/235 |
| 4,661,699 | 4/1987 | Welmers et al. | 250/235 |
| 4,700,066 | 10/1987 | Horikawa | 250/235 |
| 4,761,660 | 8/1988 | Lee | 346/108 |
| 4,962,431 | 10/1990 | Imakawa et al. | 358/296 |

FOREIGN PATENT DOCUMENTS

| 0147835 | 7/1985 | European Pat. Off. . |
| 0357190 | 3/1990 | European Pat. Off. . |

OTHER PUBLICATIONS

Patent Abstracts of Japan, vol. 5, No. 179 (E-82), Nov. 17, 1981.
Patent Abstracts of Japan, vol. 4, No. 21 (E-172) 21 Feb. 1980.

Primary Examiner—Scott A. Rogers
Attorney, Agent, or Firm—Shapiro and Shapiro

[57] ABSTRACT

A video clock signal generator comprises: means for supplying a light beam; a mask having opposite ends spaced by a predetermined distance; a vibration scanner for reflecting the light beam and forming a light spot vibrating on the mask beyond the opposite ends thereof; a detector for generating an output signal representing optical information from the mask; a counter for counting a time required for the light spot to cross the opposite ends of the mask based on the output signal of the detector; and a control unit for controlling an amplitude of the scanner mirror in accordance with the time counted by the counter.

8 Claims, 10 Drawing Sheets

VIDEO CLOCK SIGNAL GENERATOR IN AN OPTICAL SCANNER IN WHICH A MASK INCLUDING A LINEAR SCALE PROVIDES TIMING FOR CONTROLLING THE AMPLITUDE OF A VIBRATING MIRROR

This application is a continuation-in-part of application Ser. No. 07/970,868 filed Nov. 3, 1992 (abandoned).

BACKGROUND OF THE INVENTION

Field of the Invention

The present invention relates to a video clock signal generator which receives a light emitted from a light source by a linear scale through a vibration scanner, detects a light reflected by or transmitted through a grating of the linear scale and processes an output signal thereof to generate a clock pulse, and more particularly to a video clock signal generator in an optical scan type image input device such as a laser scan microscope which scans a light irradiated to a sample and senses a reflected light, a transmitted light or a fluorescent light from the sample in accordance with a position of the light to form an image.

Related Background Art

An optical scan type image input device disclosed in U.S. Pat. No. 4,212,018 generates a video clock signal by using a linear scale. It is easy to realize and hard to be affected by disturbance.

In the prior art, a laser beam from a laser light source is focused and reflected by a mirror surface of a scanner, and the reflected light is directed onto a linear scale as a scanning light spot by the rotation of the scanner. The light spot is scanned to cross a grating of the linear scale. Since it crosses the grating as it is scanned, an intensity of the laser beam transmitting through the linear scale varies. The modulated laser beam is converted to a modulated signal by a photo-sensor and the modulated signal is compared at an appropriate level so that a video clock signal is generated in accordance with the rotation of the scanner.

The prior art discloses the scanner which uses a polygon mirror although a scanner which reciprocally scans a light spot on a linear scale such as a galvanometer or a resonance type galvanometer (resonant mirror which vibrates at its resonance frequency) is also known.

Particularly, the resonant mirror is effective for the image input by high speed scan because of its high vibration frequency. However, since the resonance frequency varies by the affect of change in an environment such as a temperature, an amplitude is not stable even if an input frequency is constant, and it is difficult to form an ideal image.

In order to increase an image density, it is necessary to increase the number of video clock signals. In order to increase the video clock signals while keeping a swing angle of the scanner at a constant level, the size of the linear scale may be doubled and a focal distance of a focusing lens may be elongated to double the amplitude of the light spot. Alternatively, a pitch of the grating of the linear scale may be reduced to one half and a diameter of the light spot may be reduced to one half. However, when the focal distance of the focusing lens is elongated, the diameter of the light spot on the linear scale increases and a light spot which is small enough to the pitch of the grating cannot be attained. Same is true when the pitch of the grating is reduced to one half. In the prior art optical scan type image input device, there is a limit in the increase of the number of video clock signals whatever scanner may be used.

In the prior art device, the frequency of the amplified photo-sensor output is multiplied by a PLL (phase-locked loop) circuit, and it is supplied to a comparator to generate a required number of clock signals. The number of video clock signals may be increased by increasing the frequency multiplication factor by the PLL circuit. Where the amplitude of the scanner and the scan velocity are constant, an enlarged image may be formed by this method. However, in order to increase the multiplication factor, it is necessary to use a high speed IC for the PLL circuit, and even with such a high speed IC, the circuit may not be compatible with a high frequency or the configuration of the PLL circuit is complex. As a result, it is not easy to attain an enlarged image.

SUMMARY OF THE INVENTION

It is an object of the present invention to provide an improved video clock signal generator in an optical scan type image input device which uses a scanner.

It is another object of the present invention to provide a device for accurately controlling an amplitude of the scanner.

The optical scan type image input device of the present invention comprises a linear scale (or a mask having opposite ends thereof spaced by a predetermined distance), a reciprocating vibration scanner mirror for reflecting a laser beam from a light source to form a vibrating light spot on the linear scale, a detector for generating an output signal representing light information from the linear scale, a counter for counting a time required for the light spot to reach from one end of the linear scale to the other end in accordance with the output signal of the detector, and means for controlling an amplitude of the scanner in accordance with the reach time.

In accordance with an embodiment of the present invention, the reach time is compared with a predetermined reference time and the amplitude of the scanner is adjusted until they reach a predetermined relation.

By providing means for altering the reference time, the controlled amplitude may be easily altered.

In a preferred embodiment of the present invention, a resonance type galvanometer which is driven by a sine wave is used as the scanner.

It is other object of the present invention to provide an optical scan type image input device which can generate a number of video clock signals with a simple configuration.

The image input device of the present invention comprises a scanner for scanning a laser beam from a light source, a linear scale arranged in an optical path of the laser beam scanned by the scanner, a first optical member arranged in an optical path between the light source and the linear scale for forming two light spots of different optical characteristics on the linear scale, a second optical member for separating the light information from the two light spots into two laser beams in accordance with the optical characteristics, two photo-sensors for sensing the two laser beams separated by the second optical means and a processing circuit for generating clock signals in accordance with the output signals of the photo-sensors. A center of the two light spots is shifted by one quarter of the pitch of the grating perpendicularly to the grating of the linear scale (along a scan direction).

The processing circuit generates the clock signals based on the output signals of the two photo-sensors, and a sum signal and a difference signal thereof. Thus, signals which are phase-shifted by ⅛ period with respect to the output signals of the photo-sensors are generated.

In a preferred embodiment of the present invention, two light beams which are separable by the difference in polarization characteristic or two light beams which are separable by the difference in wavelength are used as the two light spots.

It is a further object of the present invention to provide an optical scan type image input device which can easily attain an enlarged image.

The image input device of the present invention comprises a scanner for scanning a sample, and a plurality of types of linear scales selectively arranged in an optical path of a laser beam scanned by the scanner. The plurality of types of linear scales differ from each other in the length of range in which the grating is formed (scale length). The device further comprises means for selecting one of the plurality of types of linear scales and means for changing an amplitude of the vibration scanner to cope with the scale length of the selected linear scale.

In order to enlarge the image, the range of scan of the sample of the scanner is narrowed and the range of scan of the laser beam directed to the linear scale is narrowed in synchronism therewith.

In a preferred embodiment of the present invention, the plurality of types of linear scales are attained by providing a plurality of scale patterns having different scale lengths on a scale base plate.

In other embodiment of the present invention, the plurality of types of linear scales are attained by providing a scale pattern having a continuously changing scale length so that a pitch of the grating gradually changes, on a scale base plate.

In the present invention, the linear scales of various types may have the same pitch of grating irrespective of the scale length, or the pitch of the grating may be changed in accordance with the scale length.

When the image input device of the present invention is applied to a laser scan type microscope, a magnification factor can be very readily altered.

DESCRIPTION OF THE PREFERRED EMBODIMENTS

Figure 1:
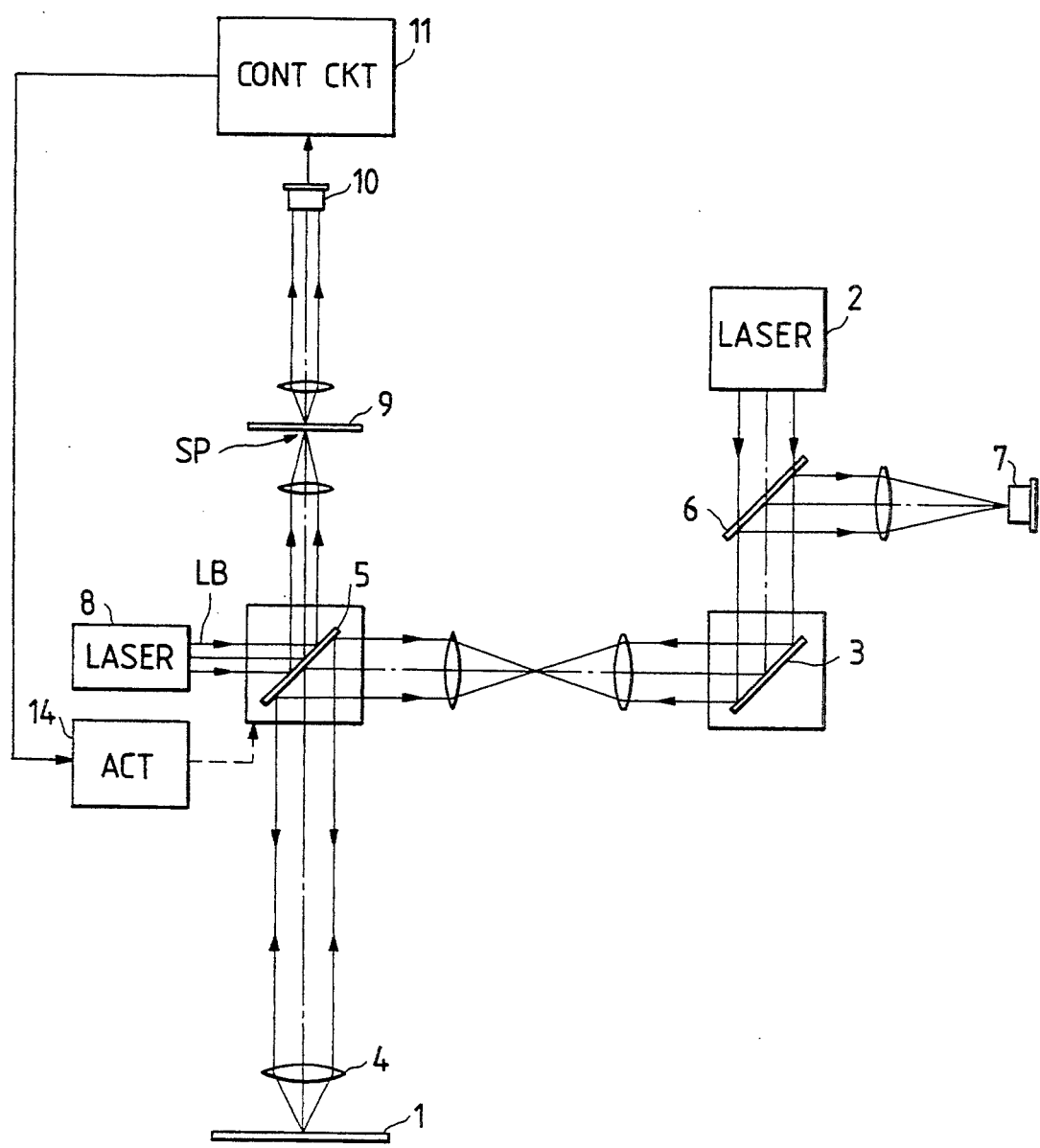
FIG. 1 shows a schematic configuration of a laser scanned microscope in a first embodiment of the present invention.

FIG. 1 shows an embodiment of a laser scanned microscope. A laser beam from a laser light source 2 is reflected by a mirror 3 and a vibration scanner 5 and it is focused by a lens 4 to form a vibrating light spot on a sample 1. A reflected light and a fluorescent light from the sample 1 are directed back to the lens 4, the vibration scanner 5 and the mirror 3, reflected by a beam splitter 6 and directed to a detector 7, which produces an image signal. An optical system including the elements 2–7 forms a confocal optical system.

The vibration scanner 5 is a resonant mirror which resonates with a sine wave at a resonance frequency. In the present embodiment, the scanner 5 has reflection planes on both planes thereof and is rotated around a rotation axis which is normal to a plane of the drawing.

Another laser light source 8 for emitting a laser beam LB to the scanner 5 is provided. The laser beam LB reflected by the scanner 5 is focused on a screen mask 9 as a light spot which vibrates in synchronism with the light spot on the sample 1. The laser beam LB transmitted through the screen mask 9 is detected by a detector 10, and a detection signal of the detector 10 is applied to a control circuit 11 for processing.

Figure 2:
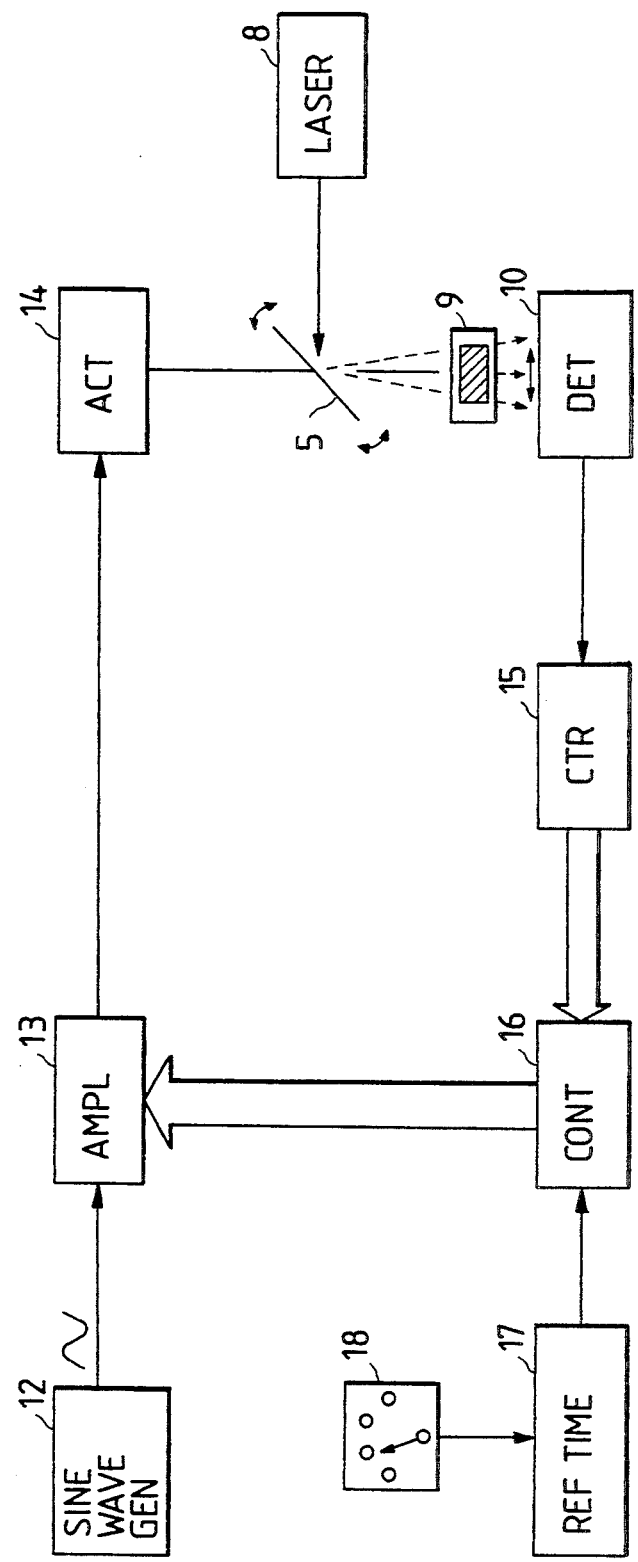
FIG. 2 shows a block diagram of a video clock signal generator.

As shown in FIG. 2, the control circuit 11 comprises a sine wave generator 12 for generating a sine wave at a resonance frequency of the scanner 5, a variable amplification factor amplifier 13 for controlling the amplitude of the sine wave, an actuator 14 for driving the scanner 5, an interval counter 15 for counting an output interval of the detection signal from the detector 10, and a controller 16 for controlling the amplification factor of the amplifier 13 in response to the output of the interval counter 15. A reference time generator 17 generates a reference time output which can be varied by an input device 18.

Figure 3:
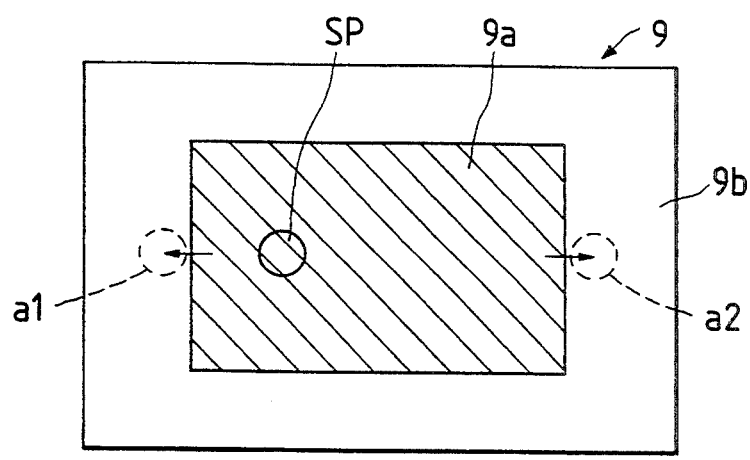
FIG. 3 shows a plan view of an optical mask for generating an amplitude control signal.

As shown in FIG. 3, the screen mask 9 is a transparent plate which has a screen area 9a of a predetermined length extending laterally at the center and light transmission areas 9b on both sides. The vibrating spot light SP by the laser beam LB reciprocates between points a1 and a2 which are located in the light transmission areas 9b beyond the opposite ends of the screen area 9a.

The sine wave amplified by the amplifier 13 is supplied to the actuator 14, which vibrates the vibration scanner 5 by the sine wave. As the scanner 5 vibrates, the laser beam from the laser light source 2 forms a light spot which reciprocates on the sample 1 parallelly to the plane of the drawing. The light energy generated from the sample by the irradiation of the laser beam to the sample 1 is directed to the detector 7 through the mirrors 5, 3 and 6, and an image of the sample is generated by the processing unit, not shown. By moving the sample 1 normally to the plane of the drawing or vibrating the mirror 3 around a rotation axis parallel to the plane of the drawings, the sample can be two-dimensionally scanned.

Figure 5:
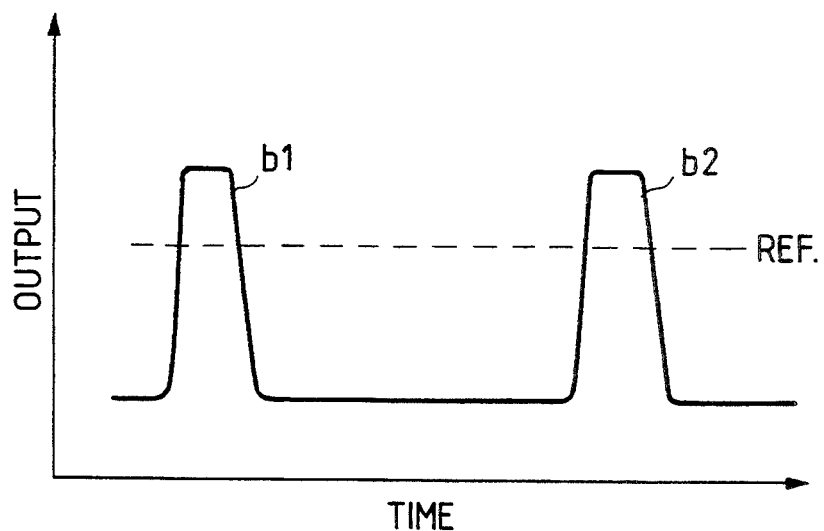
FIG. 5 shows a waveform of an output signal of a detector produced by the optical mask of FIG. 3.

On the other hand, by the vibration of the scanner 5, the laser beam LB from the laser light source 8 forms the light spot SP which reciprocates on the screen mask 9 parallelly to the plane of the drawing of FIG. 1. The laser beam LB reaches the detector 10 only when the light spot SP is on the light transmission area 9b beyond the screen area 9a of the mask 9. Thus, the detector 10 produces an output signal as shown in FIG. 5, in which two peaks b1 and b2 of the signal correspond to the points a1 and a2 of FIG. 3.

The output signal of the detector 10 is binarized by a slice level Ref and it is supplied to the interval counter 15 which counts the time interval between the two peaks b1 and b2. Since the drive frequency of the vibration mirror 5 is constant, the time interval is reduced as the amplitude of the vibration mirror 5 is increased, and is increased when the amplitude of the mirror is decreased. The controller 16 compares the output interval of the detection signal counted by the interval counter 15 with the exact reference time from the reference time generator 17 and supplies an amplification factor feedback signal to the amplifier 13, which controls the amplification factor in accordance with the feedback signal from the controller 16. As a result, the amplitude of the mirror 5 is controlled such that the time interval of the two peaks b1 and b2 of the output signal is always kept constant.

Where the amplitude of the vibration mirror 5 is to be altered, the mask 9 is replaced by another mask having a different size of the screen area, and the reference time is altered by the input device 18.

Figure 4:
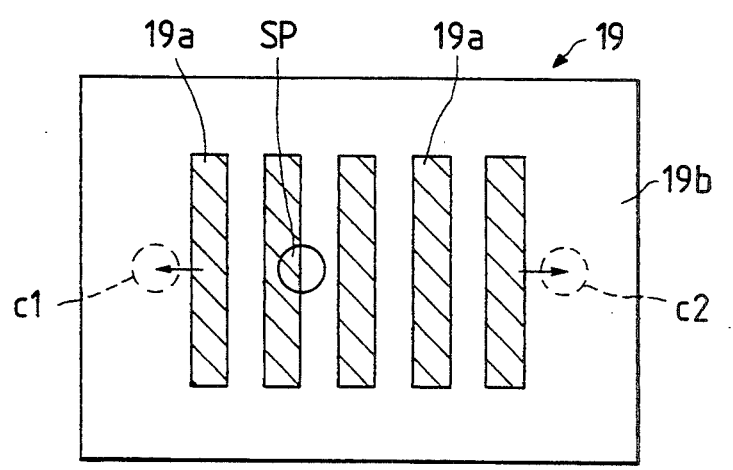
FIG. 4 shows a plan view of an optical mask formed by a linear scale.

A modification of the screen mask which uses a linear mask is shown in FIG. 4. By the use of this mask, a video clock signal to be used for the A/D conversion of the image information of the laser scanned microscope produced by the detector 7 can be generated.

The screen mask 19 is a linear scale having a number of screen areas 19a formed at a predetermined pitch along the direction of movement of the light spot. The light spot SP of the laser beam LB vibrates between outermost points C1 and C2 of the area in which the screen area is formed.

Figure 6:
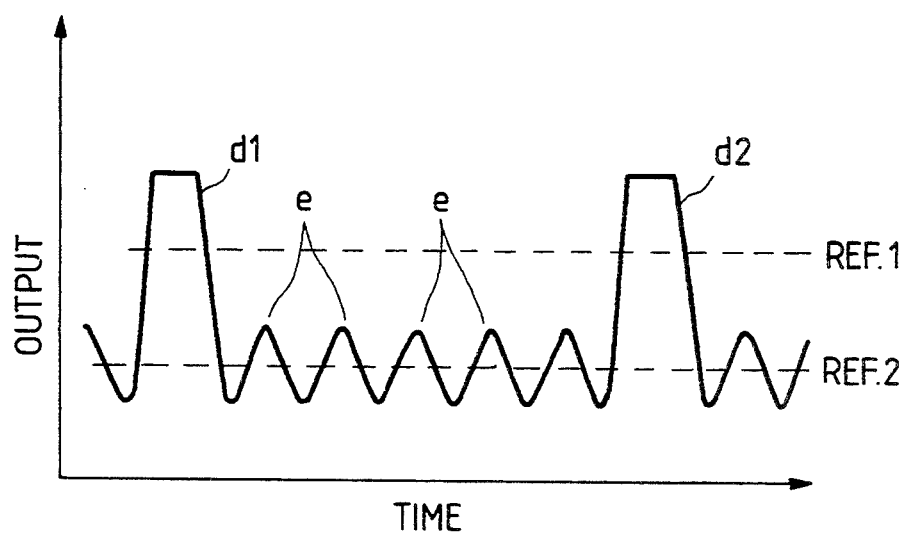
FIG. 6 shows a waveform of an output signal of the detector produced by the optical mask of FIG. 4.

The output signal of the detector 10 produced through the screen mask 19 is shown in FIG. 6. Two peaks d1 and d2 are generated to correspond to the points C1 and C2, and a number of peaks e are generated between the two peaks to correspond to the pitch of the linear scale. The two peaks are binarized by a slice level Ref 1 and it is used for the amplitude control of the vibration mirror. The peaks e are binarized by a slice level Ref 2 and it is used as a video clock signal to be used for the A/D conversion of the image information.

In the above embodiment, the light transmission area of the screen mask may be replaced by a reflection area and a reflected light from the mask may be detected. Alternatively, a reflected mirror may be detected by using the same mask as that of the embodiment, or the screen area and the light transmission area may be arranged oppositely and the transmitted signal may be detected.

A second embodiment of the present invention is now explained with reference to FIGS. 7 to 11.

Figure 7:
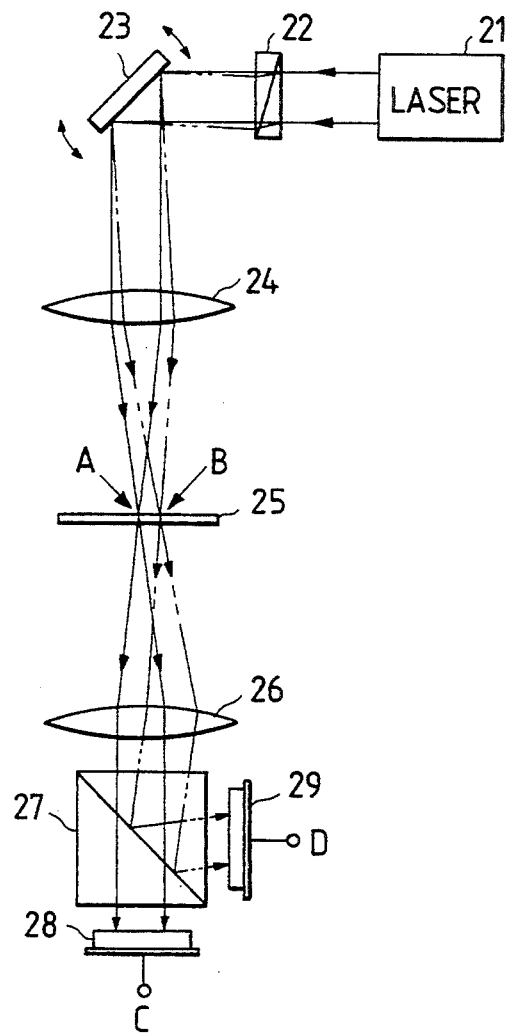
FIG. 7 shows a front view of an optical configuration of a video clock signal generator in a second embodiment of the present invention.

FIG. 7 shows a video clock signal generator. A vibration scanner 23 is arranged to face a laser light source 21 which may be a semiconductor laser unit, and a transmission type linear scale 25 is arranged within an area of the amplitude of the laser beam emitted from the scanner 23. A first optical member 22 is arranged between the laser light source 21 and the scanner 23 so that two light spots of different optical characteristics are formed on the linear scale 25 from the laser beam emitted from the laser light source 21.

The first optical member 22 is one which separates the laser beams by the difference in the optical characteristic and direct them in different directions such as a double refraction element which splits a beam by a polarization characteristic, for example, a Wollaston prism or a Nomarski prism. The scanner 23 may be a resonant mirror or a polygon mirror, or it may be a galvanometer.

Figure 8:
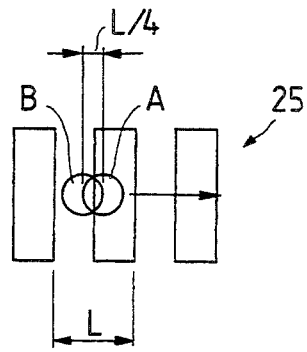
FIG. 8 shows a plan view of two laser beam spots on a linear scale.

A condenser lens 24 for focusing the laser beam onto the linear scale 25 is arranged in front of the linear scale 25. As shown in FIG. 8, the spacing between the gratings of the linear scale 25 is equal to the pitch L while the spacing between the two light spots A and B formed on the linear scale 25 by the condenser lens 24 is equal to L/4. Namely, the centers of the two light spots A and B are shifted by one quarter of the pitch in the direction of array of the grating of the linear scale 25 (in the direction of pitch).

A second optical member 27 arranged behind the linear scale 25 through a focusing lens 26 separates the two beams transmitted through the linear scale 25 based on the difference in the optical characteristic. The second optical member 27 may be a polarization beam splitter which transmits one of the two beams which form the light spots A and B and reflects the other. Two photo-sensors 28 and 29 are arranged to sense the two beams separated by the second optical member 27.

Figure 9:
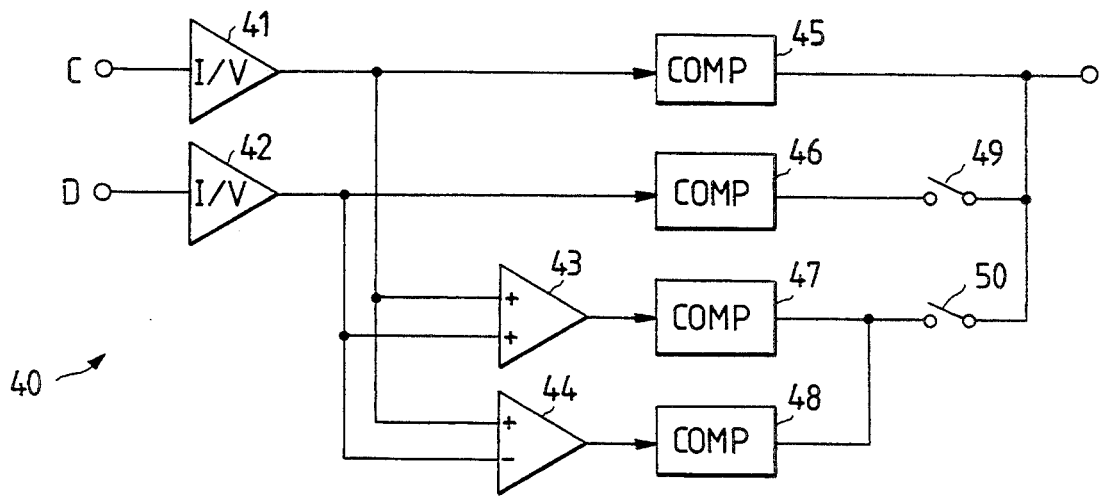
FIG. 9 shows a circuit block diagram of a signal processing circuit.

As shown in FIG. 9, a processing circuit 40 generates a clock signal based on the output signals of the photo-sensors 28 and 29, and a sum signal and a difference signal thereof. The processing circuit 40 comprises I/V conversion amplifiers 41 and 42 for receiving electrical output signals C and D from the two photo-sensors 28 and 29, a summing amplifier 43 for summing the outputs of the I/V conversion amplifiers 41 and 42 to produce a sum signal, a differential amplifier 44 for differentiating the output to produce a differential signal, comparators 45–48 for forming clock signals from the outputs of the I/V conversion amplifiers 41 and 42 and the outputs of the amplifiers 43 and 44, and clock varying switches 49 and 50.

An operation of the second embodiment is now explained.

The laser beam emitted from the laser light source 21 is split into two beams of different polarization directions by the first optical member 22, and they are directed to the scanner 23. The scanner 23 vibrates the two beams and directs them toward the linear scale 25. The two directed beams are focused by the condenser lens 24 so that the two light spots A and B of the different optical characteristics are formed on the linear scale 25. The two light spots A and B are scanned to cross the grating of the linear scale 25 by the scanner 23.

Figure 10:
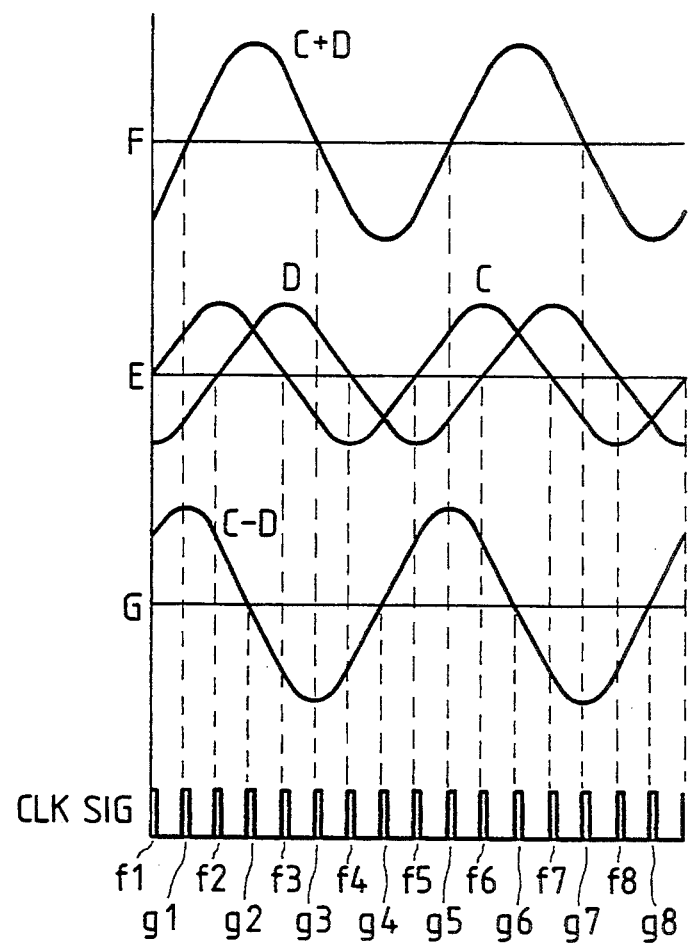
FIG. 10 shows a time chart of signal processing in the signal processing circuit.

The two laser beams which were intensity-modulated by the linear scale 25 are directed to the second optical member 27 where they are separated by the polarization. In the drawing, the beam which forms the light spot A is transmitted through the second optical member 27 and the beam which forms the light spot B is reflected. Both beams are directed to the two photo-sensors 28 and 29, respectively, and are photo-electrically converted to the output signals C and D, which are supplied to the processing circuit 40. The output signals C and D have a phase shift of $\pi/2$ from each other as shown in FIG. 10.

The two output signals C and D are applied to the I/V amplifiers 41 and 42 of the processing circuit 40 for the I/V conversion, and the outputs therefrom are compared by the comparators 45 and 46 with an appropriate level so that equi-interval clock signals f1, f2,... which are double in number compared with those produced by one light spot are produced.

The two output signals C and D are combined by the summing amplifier 43 to produce the sum signal F, and combined by the differential amplifier 44 to produce the differential signal G. They are shifted in phase by $\frac{1}{8}$ period with respect to the two output signals C and D, respectively, so that further clock signals g1, g2, ... are produced. By selectively operating the switches 49 and 50, the output clock signals may be controlled. By using a known insertion method, more number of clock signals can be generated.

Figure 11:
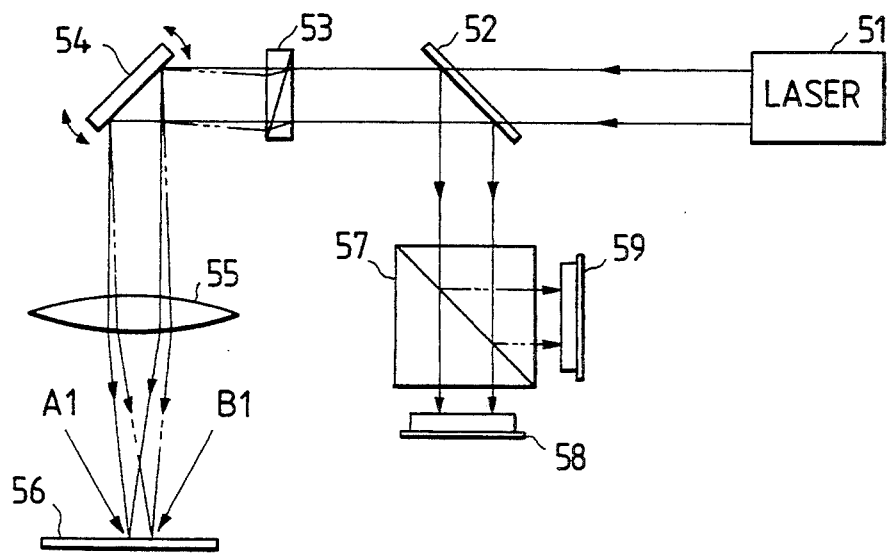
FIG. 11 shows a front view of an optical configuration of a modification of the video clock signal generator.

When a reflection type linear scale is used, the video clock signal generator may be configured as shown in FIG. 11.

A vibration scanner 54 is arranged to face the laser light source 51, and the laser beam emitted from the scanner 54 is focused onto a reflection type linear scale 56 by a focusing lens 55. A first optical member 53 for forming two light spots A1 and B1 of different optical characteristics are arranged between the laser light source 51 and the scanner 54. Like in the embodiment of FIG. 7, centers of the two light spots A1 and B1 are shifted by one quarter of the pitch in the direction of array of the grating of the linear scale 56 (in the direction of pitch).

The scanner 54 and the linear scale 56 are arranged at conjugate positions to the focusing lens 55. The laser beam reflected by the surface of the linear scale 56 is directed back along the substantially same optical path, reflected by the beam splitter 52 and separated by a second optical member 57. Two photo-sensors 58 and 59 are mounted on the second optical member 57 to sense the two separated signals.

The output signals of the two photo-sensors 58 and 59 are processed by the processing circuit 40 as they are in the embodiment of FIG. 7.

Figure 12:
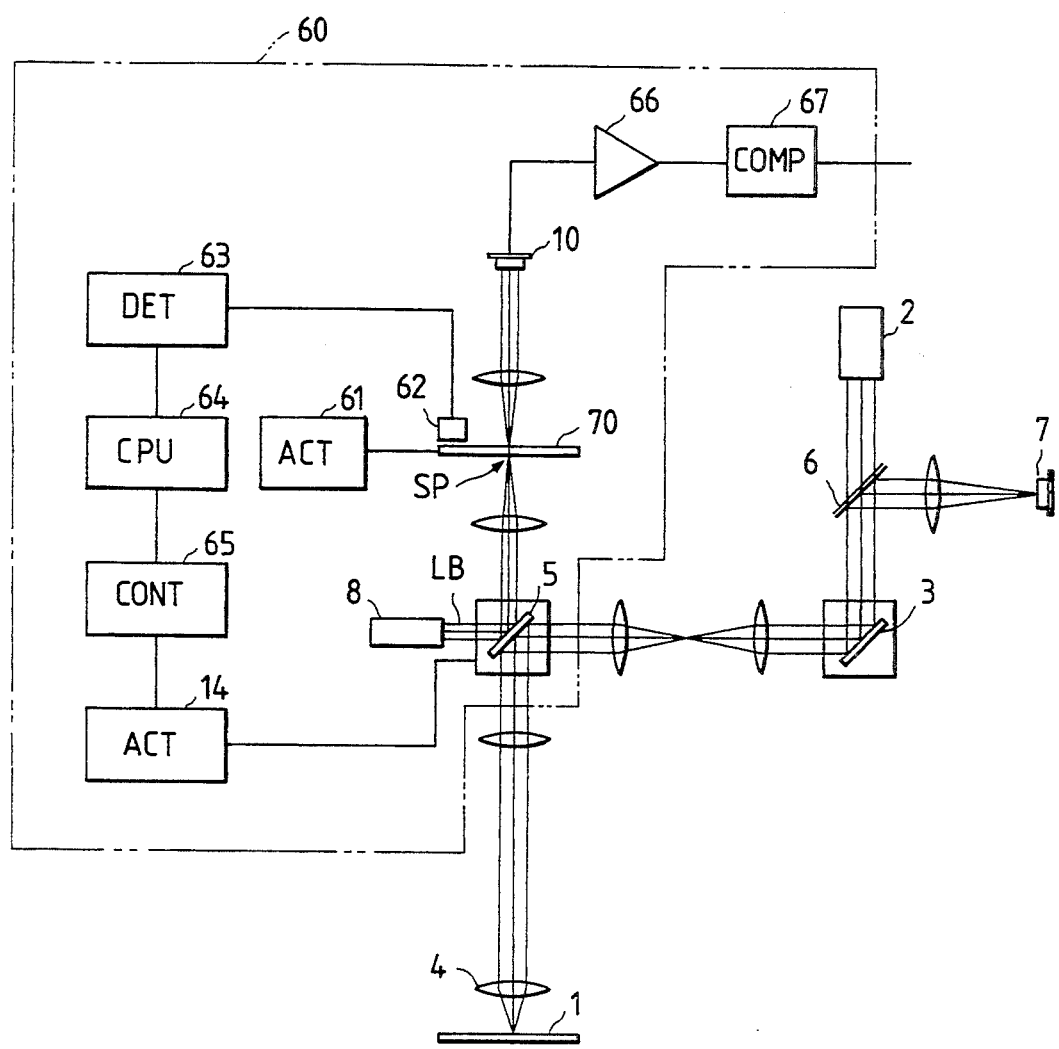
FIG. 12 shows a schematic configuration of a laser scanned microscope in a third embodiment of the present invention.

A third embodiment of the present invention which allows to vary the magnification factor is now explained with reference to FIGS. 12 to 15. FIG. 12 shows a schematic configuration of a scanning microscope and the like elements to those shown in FIG. 1 are designated by the like numerals and the explanation thereof is omitted. A construction and an operation of the video clock signal generator 60 are explained below in detail.

A laser beam LB from a laser light source 8 is reflected by a vibration scanner 5 and focused to a light spot SP which vibrates on a linear scale 70.

Figure 13:
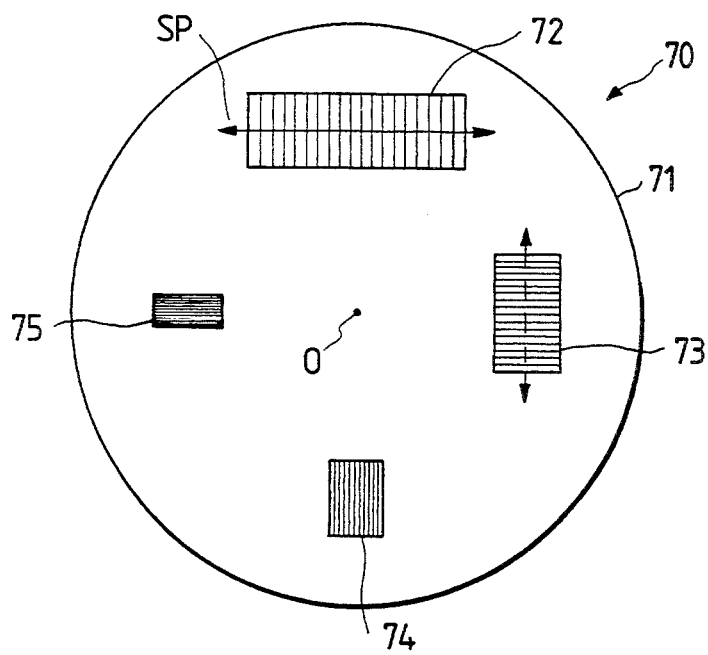
FIG. 13 shows a front view of a linear scale in the third embodiment.

As shown in FIG. 13, the linear scale 70 is formed by a circular transparent plate 71 on which four patterns 72 to 75 are circumferentially spaced from each other. The four patterns 72 to 75 have different widths of areas in which the gratings are formed. Assuming that the width of the pattern 72 is 1, the widths of the patterns 73 to 75 change stepwise to $\frac{1}{2}$, $\frac{1}{4}$ and $\frac{1}{8}$, respectively.

The numbers of gratings of the four patterns 72 to 75 are equal. Accordingly, assuming that the pitch of the grating of the pattern 72 is "1", the pitches of the gratings of the patterns 73 to 75 change stepwise to $\frac{1}{2}$, $\frac{1}{4}$ and $\frac{1}{8}$, respectively.

As shown in FIG. 12, an actuator 61 for rotating the linear scale 70 to face the patterns 73 to 75 to the light spot SP, and a detector 62 for detecting the rotation position of the linear scale 70 are provided. A detection circuit 63 is connected to the detector 62. The detection circuit 63 is connected to an actuator 14 through a CPU 64 and an amplitude control circuit 65 for controlling the amplitude of the vibration scanner 5.

An amplifier 66 for amplifying a detection signal is connected to a detector 10 which detects the laser beam LB transmitted through the grating of the linear scale 70, and a comparator 67 is connected to the amplifier 66.

An operation of the third embodiment is now explained.

In FIG. 12, the laser beam LB reflected by the surface of the vibration scanner 5 forms a light spot on the linear scale 70. Where the rotation position of the linear scale 70 is set such that the pattern 72 is positioned on the optical axis, the light spot SP is scanned on the pattern 72 in a direction of solid line arrow in FIG. 13. The laser beam LB transmitted through the pattern 72 is detected by the detector 10. The detection signal of the detector 10 is amplified by the amplifier 66 and applied to the comparator 67 where it is converted to clock signals which correspond to the number of gratings of the pattern 72.

On the other hand, the sample 1 is scanned by the laser beam from the laser light source 2 through the vibration scanner 5. The scan of the sample 1 is in synchronism with the scan of the linear scale 70. The image signal from the detector 7 is sampled in synchronism with the clock signal from the comparator 67 to form the image of the sample 1. By forming the clock signal by using the pattern 72, the image of a relatively wide view field corresponding to the width of the pattern 72 can be formed.

In order to enlarge the image, the linear scale 70 is rotated around a center 0 by the actuator 61. When the linear scale 70 is rotated until the pattern 73 is positioned on the optical axis, the position thereof is detected by the detection circuit 63 based on the output of the detector 62. The CPU 64 determines the amplitude of the spot vibrating on the linear scale 70 based on prestored data such that the amplitude of the spot is substantially equal to the width of the pattern 73, and controls the actuator 14 through the amplitude control circuit 65.

As a result, the swing angle of the vibration scanner 5 is reduced and the range of scan of the light spot is reduced to one half of that for the pattern 72. The range of scan of the light irradiated to the sample 1 is also reduced to one half. Since the number of gratings of the pattern is same even if the range of scan is reduced to one half, the number of clock signals from the comparator 67 does not decrease. In this manner, a double size enlarged image is formed and the sample can be observed at a high resolution.

By rotating the linear scale 70 to sequentially bring the pattern 74 and the pattern 75 to face the optical axis, the enlarged image of 4 times and 8 times are attained.

Figure 14:
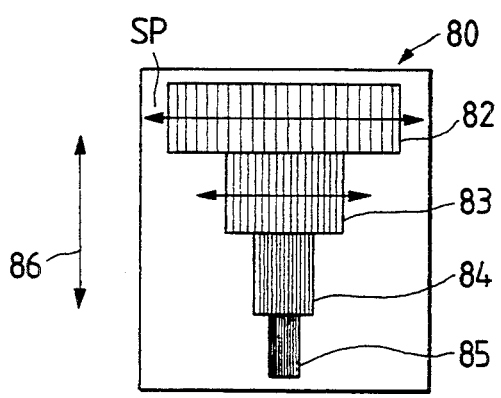
FIG. 14 shows a front view of a modification of the linear scale of the third embodiment.
Figure 15:
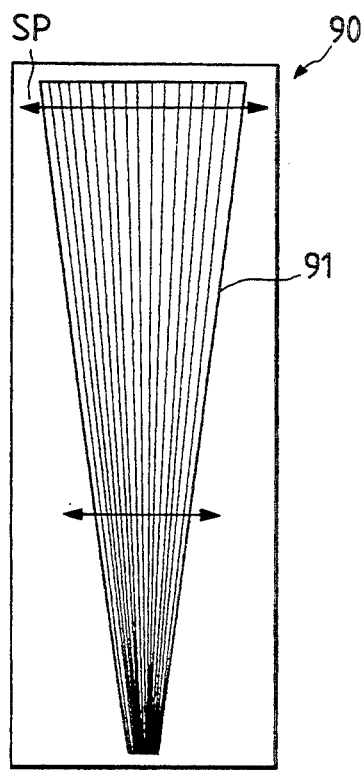
FIG. 15 shows a front view of another modification of the linear scale of the third embodiment.

FIGS. 14 and 15 show modifications of the linear scale.

A linear scale 80 of FIG. 14 has four patterns 82 to 85 formed perpendicularly to the direction of movement of the light spot SP (the direction of an arrow 86). Assuming that the pitch of the grating of the pattern 82 is 1, the patterns 83 to 85 have stepwise pitches of $\frac{1}{2}$, $\frac{1}{4}$ and $\frac{1}{8}$, respectively.

A linear scale 90 of FIG. 15 has a pattern 91 having a continuously varying pitch formed perpendicularly to the direction of movement of the light spot SP (the direction of an arrow 96). The pitch of the grating at a lower end of the pattern 91 is $\frac{1}{8}$ of that at an upper end, and the width of the pattern in the scan direction is also reduced to $\frac{1}{8}$. As a result, continuous enlargement and reduction of the image are attained.

In the present embodiment, the control circuit 11 of the first embodiment may be used in place of the amplitude control elements 62 to 65 to attain the automatic change of the amplitude in response to the replacement of the linear scale.

In the present embodiment, the patterns on the linear scale may have the same pitch of the grating with the difference in only the width. In this case, the number of clock signals produced by the comparator 67 derived from the narrow pattern is smaller than that derived from the wide pattern. However, the clock signal may be frequency-multiplied in the same manner as that of the second embodiment to produce the required number of video clock signals.

Figure 16:
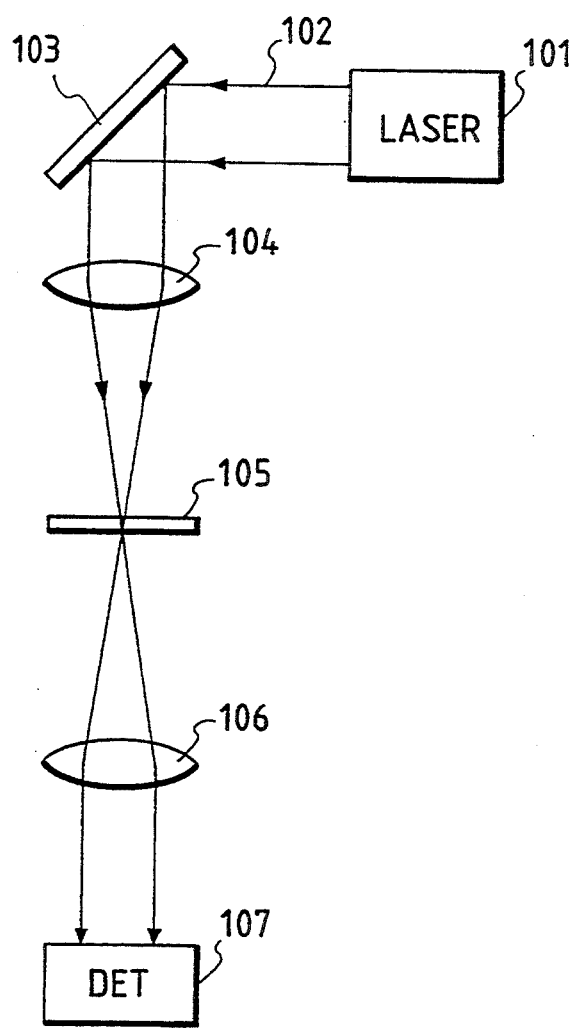
FIG. 16 shows a schematic configuration of a video clock signal generator in a fourth embodiment.

Next, referring to FIG. 16, the fourth embodiment of the present invention is explained below.

A laser beam 102 from a laser light source 101 is reflected by a resonant mirror scanner 103 and it is focused by a focusing lens 4 to form a light spot on a linear scale 105. A focusing lens 6 focuses the laser beam 102 passing through the linear scale 105 with intensity-modulation thereat, on a light receiving element 107.

Figure 17:
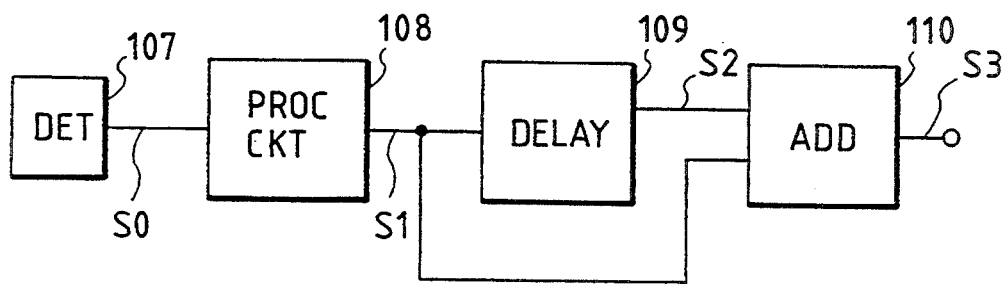
FIG. 17 shows a circuit block diagram of a signal processing circuit.
Figure 18:
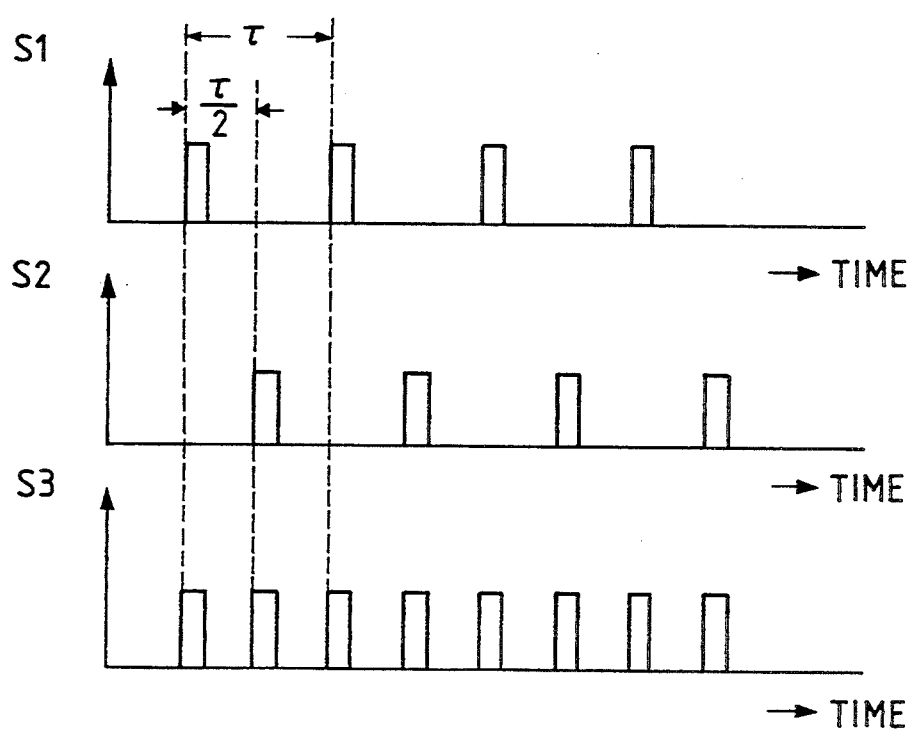
FIG. 18 shows a time chart of output clock signals.

An alternating analog electrical signal S0 from the light receiving element 107 is inputted into a processing circuit 108 shown in FIG. 17. The processing circuit 108 processes the electrical signal S0 with a current-voltage conversion and an analog-to-digital conversion, and outputs a first clock signal S1 comprising sequentially generated pulses. The first clock signal S1 is inputted into a delay circuit 109 and an add circuit 110.

The delay circuit 109 delays the first clock signal S1 by a predetermined time. If the first clock signal S1 has a time period $\tau$, the predetermined time is preferably $\tau/2$. Thus, as shown in FIG. 1B, a second clock signal S2 having the same frequency, but a shifted phase with respect to the first clock signal S1, is outputted.

The add circuit 110 adds the first clock signal S1 from the processing circuit 108 and the second clock signal S2 from the delay circuit 10R to produce a video clock signal S3 having a frequency twice higher than that of the signal S1 or S2, of which pulses are substantially regularly generated. If the first clock signal has pulses regularly generated, the video clock signal SB also has pulses strictly regularly generated.

In this embodiment, another delay circuit for delaying the video clock signal SB by $\tau/4$ may be electrically connected to the output of the add circuit 108, whereby a video clock signal having a frequency four times higher than that of the first clock signal S1 is produced by adding the signal SB and the $\tau/4$-delayed signal from the second-mentioned delay circuit.

What is claimed is:

1. A video clock signal generator comprising:
   a linear scale having a plurality of gratings arranged at a predetermined pitch;
   beam supply means for supplying a first beam having a first optical characteristic for forming a first light spot on the linear scale and a second beam having a second optical characteristic for forming a second light spot on the linear scale,
   a center of the first light spot and a center of the second light spot being spaced from each other by a predetermined distance in a direction of array of the gratings;
   a scanner for scanning the first light spot and the second light spot on the linear scale in the direction of array of the gratings; and
   processing means for generating the video clock signal in accordance with optical information on the first beam from the linear scale and optical information on the second beam from the linear scale.

2. A video clock signal generator according to claim 1 wherein said beam supply means includes a light source for emitting a light beam and a first optical member for separating the light beam from the light source into two optically different components and directing the components in different directions, and said processing means includes a second optical means for separating optical information on the first beam from the linear scale and the optical information on the second beam from the linear scale.

3. A video clock signal generator according to claim 1 wherein said beam supply means includes a light source for emitting a light beam and an optical member for separating the light beam from the light source into two optically different components and directing the components in different directions.

4. A video clock signal generator according to claim 3 wherein said optical member is a double refraction element for separating the light beam in accordance with a difference in a polarization characteristic.

5. A video clock signal generator according to claim 1 wherein said processing means includes an optical member for separating the optical information on the first beam from the linear scale and the optical information on the second beam from the linear scale, first and second detectors for generating first and second output signals based on the optical information separated by the optical member, and a processing circuit for generating the clock signal in accordance with the first and second detection signals.

6. A video clock signal generator according to claim 5 wherein said processing circuit includes an adder for producing a third output signal which is a sum signal of the first and second output signals, a subtractor for producing a fourth output signal which is a differential signal of the first and second output signals, and a comparator for producing the clock signal from the first, second, third and fourth output signals.

7. A video clock signal generator according to claim 1 wherein a center of the first light spot and a center of the second light spot are spaced from each other by one quarter of a pitch of the grating in the direction of the array of the grating.

8. An optical scanning image input device comprising:
- a linear scale having a plurality of gratings arranged at a predetermined pitch;
- beam supply means for supplying a first beam having a first optical characteristic for forming a first light spot on the linear scale and a second beam having a second optical characteristic for forming a second light spot on the linear scale;
- a center of the first light spot and a center of the second light spot being spaced from each other by a predetermined distance in a direction of array of the gratings;
- a scanner for scanning the first light spot and the second light spot on the linear scale in the direction of array of the gratings;
- processing means for generating the video clock signal in accordance with optical information on the first beam from the linear scale and optical information on the second beam from the linear scale;
- means for generating an image signal synchronized with the vibration scanner mirror; and
- means for forming an image from the image signal and the video clock signal.

* * * * *

UNITED STATES PATENT AND TRADEMARK OFFICE
CERTIFICATE OF CORRECTION

PATENT NO.   :   5,446,556
DATED        :   August 29, 1995
INVENTOR(S)  :   Hisashi Okugawa et al It is certified that error appears in the above-identified patent and that said Letters Patent is hereby corrected as shown below:

On the title page, item:

item [75], should read --Hisashi Okugawa; Yutaka Ichihara, both of Yokohama; Satoru Kumagai, Chigasaki, all of Japan--.

Signed and Sealed this

Twenty-eighth Day of November 1995

Attest:

BRUCE LEHMAN

*Attesting Officer*   *Commissioner of Patents and Trademarks*